April 18, 1961    R. G. FINNEY    2,980,371
CONSTANT DISREEFING MEANS FOR PARACHUTES
Filed Dec. 1, 1958    2 Sheets-Sheet 1

INVENTOR.
REX GUY FINNEY
BY Knox & Knox

April 18, 1961  R. G. FINNEY  2,980,371
CONSTANT DISREEFING MEANS FOR PARACHUTES
Filed Dec. 1, 1958  2 Sheets-Sheet 2
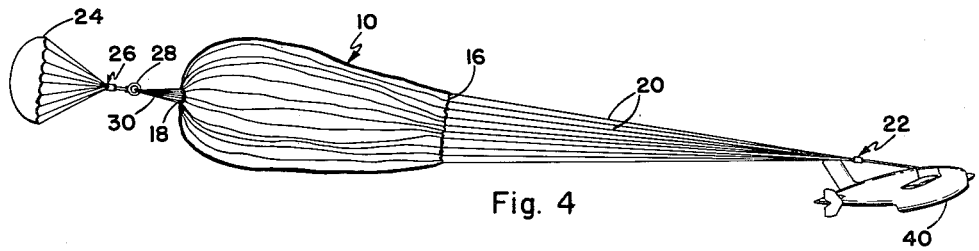
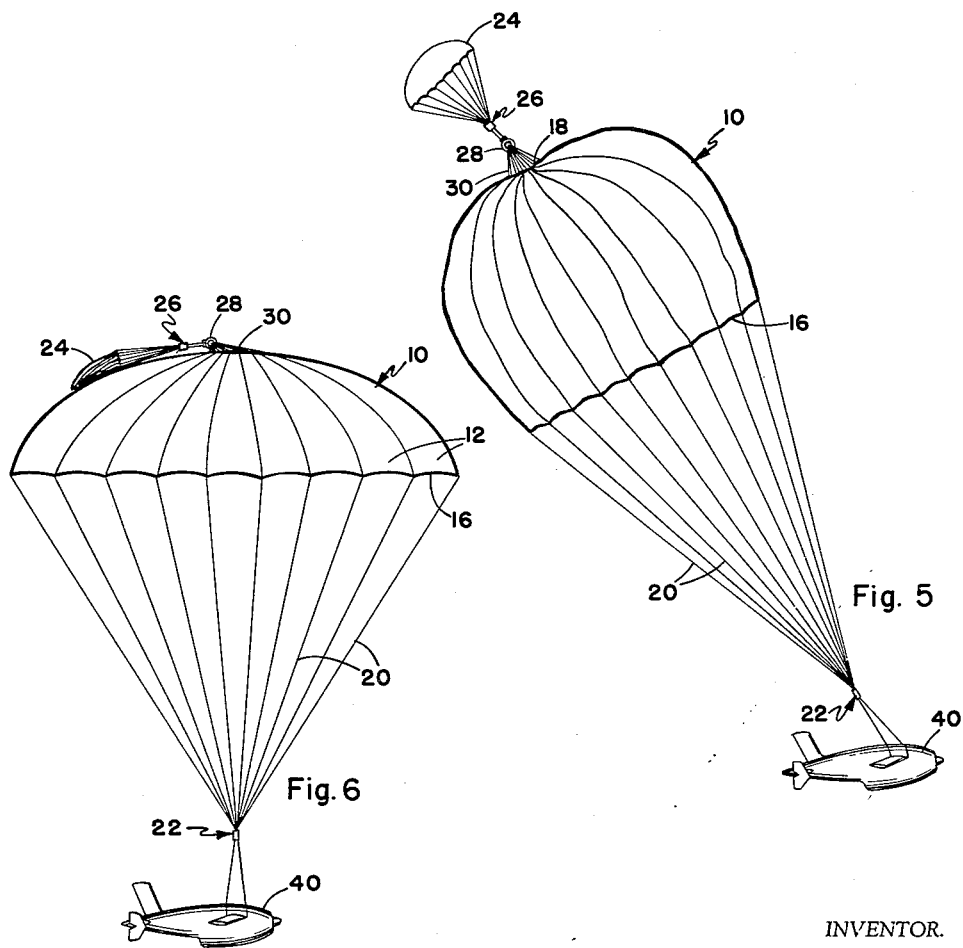
INVENTOR.
REX GUY FINNEY
BY Knox & Knox

United States Patent Office

2,980,371
Patented Apr. 18, 1961

2,980,371

CONSTANT DISREEFING MEANS FOR PARACHUTES

Rex Guy Finney, La Mesa, Calif., assignor to The Ryan Aeronautical Co., San Diego, Calif.

Filed Dec. 1, 1958, Ser. No. 777,294

4 Claims. (Cl. 244—152)

The present invention relates generally to parachutes and more particularly to a constant disreefing means for parachutes.

The primary object of this invention is to provide a constant disreefing means which enables a parachute to be ejected at high speed in a collapsed or reefed condition and will allow the parachute to open gradually as the speed decreases, the rate of openings being inversely proportional to the speed.

Another object of this invention is to provide a disreefing means which is connected directly to the pilot chute used to extend the main parachute, the pilot chute acting as a speed influenced drag element to control the opening of the main canopy.

Still another object of this invention is to provide a disreefing means which allows the main parachute to open quickly at low speeds and gradually at high speeds, the rate of opening corresponding to the reduction in speed, so that the parachute is fully opened at the optimum free fall speed of the loaded parachute.

A further object of this invention is to provide a disreefing means which allows the main parachute to act as a second stage drag means, in addition to the pilot chute, during the stages of opening.

Another object of this invention is to provide a disreefing means in which the initial snatch load of the pilot chute is applied to the skirt of the canopy adjacent the shroud lines and consequently minimizes the strain on the canopy fabric.

Finally, it is an object to provide a parachute disreefing means of the aforementioned character which is simple, safe and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Figure 4 is a diagrammatic view of the parachute in the initially extended, reefed position at high forward speed, a pilotless aircraft being illustrated as a load;

Figure 5 is a diagrammatic view showing the parachute partially opened at low forward speed; and Figure 6 is a diagrammatic view of the parachute fully opened in vertical free fall.

Similar characters of reference indicate similar or identical elements and portions throughout the specification and throughout the views of the drawings.

Figure 1:
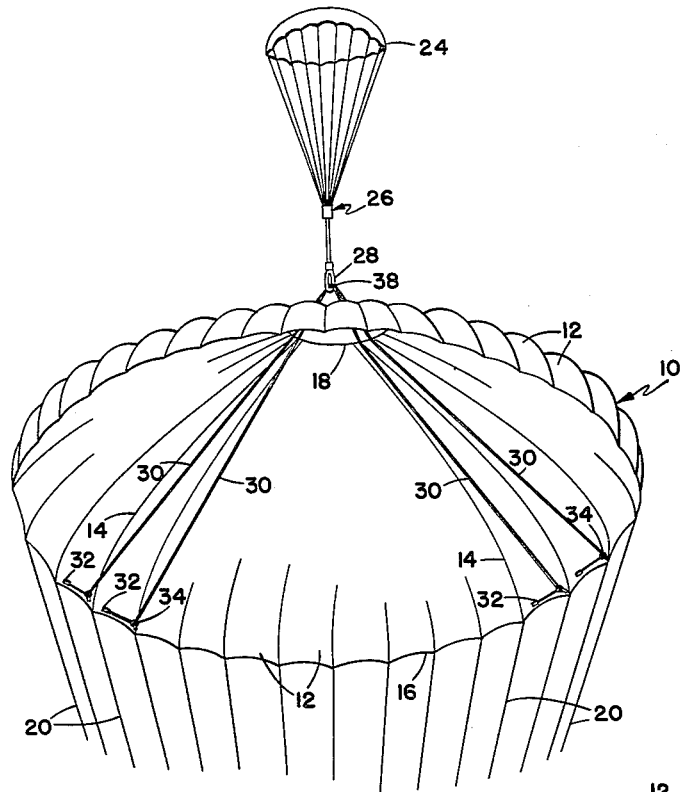
Figure 1 is a perspective view, from below, of a parachute canopy fully opened with pilot chute extended, the shroud lines in the foreground being omitted for clarity.

Referring now to the drawings in detail, the main parachute canopy 10 comprises a plurality of tapered panels or gores 12 interconnected by seam 14, the canopy having a peripheral portion which will be generally referred to herein as the skirt 16 and a central opening 18. The canopy 10 is provided with a plurality of shroud lines 20 secured to the skirt 16 at each seam 14, the shroud lines being collectively secured to a suitable harness 22. The construction of the canopy 10 and the arrangement and attachment of the shroud lines and harness are conventional and subject to variation, illustration and description of such details as seam stitching and shroud line attachment reinforcements having been omitted from this disclosure as unnecessary for a full understanding of the invention. The parachute is extended by a self-opening pilot chute 24 which is of conventional type, and has a harness 26 carrying an attachment ring 28.

Figure 2:
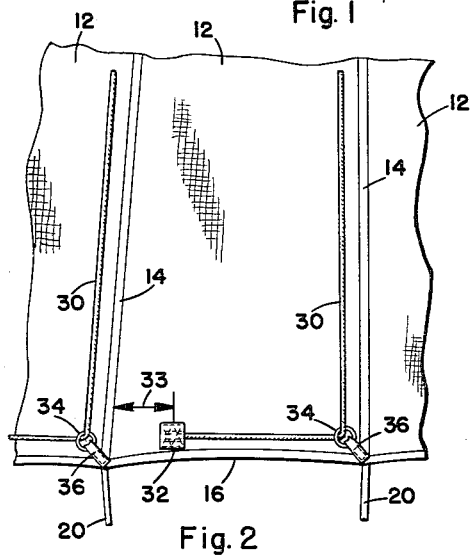
Figure 2 is an enlarged fragmentary view of a portion of the canopy skirt showing the attachment of the reefing lines thereto, the canopy being fully extended.
Figure 3:
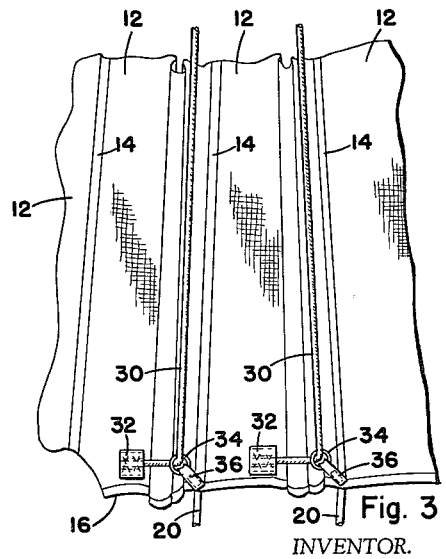
Figure 3 is a view similar to Figure 2, but showing the canopy in the collapsed or reefed position.

The disreefing means comprises a plurality of reefing lines 30 of nylon or the like, similar to the shroud lines 20, one reefing line being attached to each gore 12. Each reefing line 30 is terminally secured to the skirt 16 with a reinforcing patch 32 a short distance from one seam 14, as in Figure 2, the distance 33 between the seam and the fixed end of the line representing a modulus determining the reefed diameter of the skirt, as will hereinafter be apparent. It should be noted that the modulus distance need not be less than the width of a gore. The reefing lines 30 are each threaded through guide means represented as a guide ring 34 secured by a tab 36 to the skirt 16 at the other seam of the same gore 12, each reefing line extending from said guide ring, along the last mentioned, adjacent seam and through the central opening 18, but the reefing lines are not attached to the canopy 10 at any other point. As illustrated, the reefing lines 30 are provided in pairs and each pair comprises a composite element having its opposite ends secured to a pair of diametrically opposed gores and having a central bight portion passed through the attachment ring 28, back through the central opening 18 and is terminally secured to the skirt 16 at the gore 12 diametrically opposed to the gore to which the other end of the line is secured, as described above. Each reefing line 30 is thus terminally secured to a pair of diametrically opposed gores at their skirt ends and has a central bight portion 38 held by the attachment ring 28. It will be evident that by pulling on any particular reefing line 30, the line will slide through its guide ring 34 and pull the particular gore into a nearly completely folded position herein referred to as the reefed position, as in Figure 3. It follows that by pulling all of the reefing lines 30 simultaneously, all gores 12 are folded and the skirt 16 is collapsed to a minimum circumference regarded as the reefed diameter of the canopy 10. The circumference of the reefed skirt 16 is determined by the modulus distance 33 from the fixed end of each reefing line 30 to the adjacent guide ring 34 of the next gore 12, multiplied by the number of gores in the canopy. Thus by reducing the spacing of the fixed ends of the reefing lines 30 from the seams 14, the reefed diameter of the canopy 10 is reduced. Normally, the higher the speed at which the parachute is to be ejected, the smaller the reefed diameter of the canopy must be to avoid high speed opening shock which might rupture the canopy.

In operation, the parachute is carried in a stowed position attached to the load which it is to support. In the drawings, the load is illustrated as a pilotless aircraft 40 which is used as a gunnery target and is recovered by parachute after each flight. It should be understood, however, that the parachute is not limited to such use and is equally suitable for use as a personnel parachute, or on escape capsules or cargo packages. The parachute is designed for release at high forward speeds and is actuated by a suitable release control. When the pilot chute 24 is released, it opens automatically and is carried rapidly downstream in the airflow, so pulling the main canopy 10 and its shroud lines 20 from the stowed position. As the parachute assembly reaches the fully extended position, the pilot chute 24 is arrested suddenly and the resultant snatch load is transferred through the harness 26 to the reefing lines 30. Since the reefing lines 30 are attached only to the skirt 16, the snatch load is applied through the skirt to the shroud lines 20, so minimizing sudden shock loads on the canopy itself. The pilot chute 24 causes considerable air drag at high speed and exerts a strong pull on the disreefing lines 30 to hold the skirt 16 closed in the reefed position, as in Figure 4, the reefed canopy 10 causing a relatively small additional drag. The drag of the extended parachute assembly causes the aircraft 40 to lose forward speed and, in doing so, the air resistance on the pilot chute 24 decreases. In turn, the pull on the reefing lines 30 relaxes and the airstream begins to expand the canopy 10, as in Figure 5. The partially reefed canopy 10 acts as a second stage drag means to assist the pilot chute 24 in decelerating the aircraft 40. When the speed has been sufficiently reduced as, for example, when the forward speed of a horizontally moving load is reduced virtually to zero, the drag of the pilot chute 24 is at a minimum and the pilot chute eventually collapses on top of the canopy 10, although the collapse may not be complete. With the reefing lines 30 now relaxed, the canopy 10 is fully disreefed or extended and the aircraft 40 or other load is in free vertical fall at the designed speed.

The size of the main canopy 10 is thus determined by the modulus distance 33 when reefed and controlled by the air drag effective on the pilot chute 24, which is dependent on the speed of the load. The disreefing means causes gradual deceleration of the load and corresponding gradual opening of the canopy at a rate which is designed to prevent damage to the canopy by the high speed airstream. At low speeds, the air drag on the pilot chute 24 is naturally less and the canopy opens in a shorter time. The disreefing means may be applied to many existing parachutes with a minimum of alteration, to provide a parachute assembly which will function with an efficiency at least equal to that of more complex and expensive parachutes such as the ribbon type, which are designed for high speed use, and the greater simplicity of construction minimizes the likelihood of malfunction.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. In combination: a parachute, comprising: a canopy having a plurality of interconnected gores, said canopy having an outer skirt and a central opening, a plurality of shroud lines secured to said skirt at spaced intervals, and means for securing said shroud lines to a load; a pilot chute having an attachment harness thereon; and a plurality of reefing lines each terminally fixed at points in said skirt; a guide means fixed to said skirt a short distance measured circumferentially of the canopy from each of said points, each reefing line passing through the corresponding guide means and being connected to said attachment harness, whereby tension on said reefing lines caused by the drag of said pilot chute causes collapse of said skirt to a predetermined minimum circumference substantially equal to the full circumference less the sum of the distances between the fixed ends of said reefing lines at said skirt and their respective guide means.

2. In combination: a parachute, comprising: a canopy having a plurality of interconnected gores, said canopy having an outer skirt and a central opening, a plurality of shroud lines secured to said skirt at spaced intervals, and means for securing said shroud lines to a load; a pilot chute having an attachment harness thereon; and a plurality of reefing lines terminally fixed to said skirt at points spaced circumferentially of the canopy a distance constituting a modulus distance from one edge of each of said gores, a guide means fixed to the skirt at the transversely opposite edge of each of said gores, each reefing line passing through the corresponding guide means and being connected to said attachment harness, whereby tension on said reefing lines caused by the drag of said pilot chute causes collapse of said skirt to a predetermined minimum circumference substantially equal to the sum of the said modulus distances.

3. In combination: a parachute, comprising a canopy having a plurality of interconnected gores, said canopy having an outer skirt and a central opening, a plurality of shroud lines secured to said skirt at spaced intervals, and means for securing said shroud lines to a load; a pilot chute having an attachment ring secured thereto; and a plurality of reefing lines corresponding to the number of gores in said canopy, each of said reefing lines being terminally fixed at one end to said skirt a short distance constituting a modulus distance from one edge of each of said gores, a guide ring fixed to the skirt at the opposite edge of each of said gores, each reefing line passing through the corresponding guide ring and through said central opening and being attached at the other end to said attachment ring, whereby tension on said reefing lines caused by the drag of said pilot chute causes collapse of said skirt to a predetermined minimum circumference substantially equal to the sum of the said modulus distances.

4. A combination according to claim 3, and wherein said reefing lines are provided in pairs and each pair of said reefing lines comprises a composite element having its opposite ends secured to a pair of diametrically opposed gores, and having a central bight portion passing through said attachment ring.

References Cited in the file of this patent

UNITED STATES PATENTS

| 2,520,931 | Heinrich | Sept. 5, 1950 |
| 2,610,008 | Smith | Sept. 9, 1952 |
| 2,721,716 | Beadle | Oct. 25, 1955 |

FOREIGN PATENTS

| 824,349 | France | Nov. 10, 1937 |